March 31, 1925.  1,531,596
A. W. COPLEY
CIRCUIT INTERRUPTER
Filed April 23, 1920
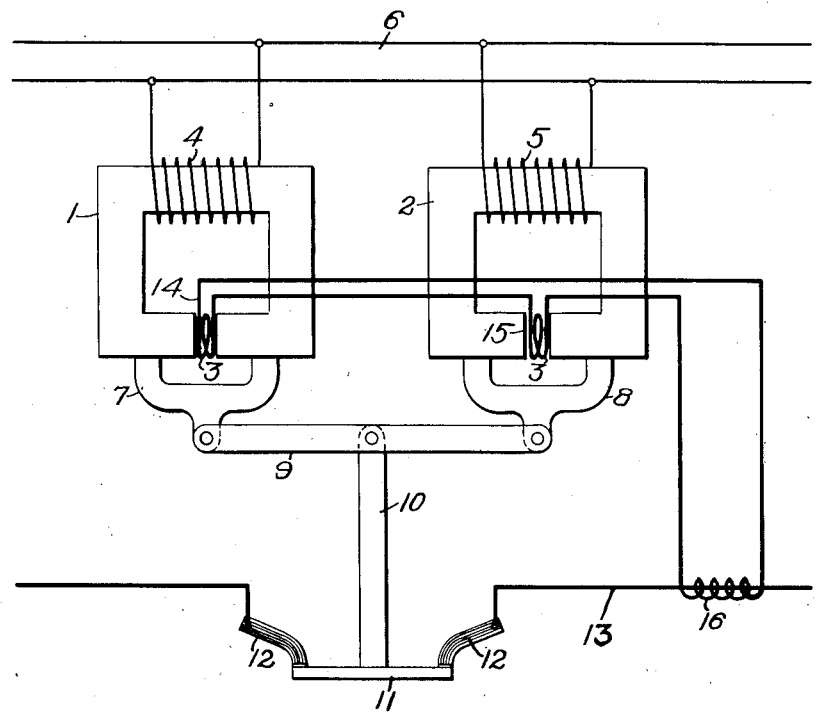
WITNESSES:
J. A. Helsel
F. H. Miller
INVENTOR
Almon W. Copley.
BY
Wesley Glaar
ATTORNEY Patented Mar. 31, 1925.

1,531,596

UNITED STATES PATENT OFFICE.

ALMON W. COPLEY, OF WILKINSBURG, PENNSYLVANIA, ASSIGNOR TO WESTINGHOUSE ELECTRIC & MANUFACTURING COMPANY, A CORPORATION OF PENNSYLVANIA.

CIRCUIT INTERRUPTER.

Application filed April 23, 1920. Serial No. 375,950.

*To all whom it may concern:*

Be it known that I, ALMON W. COPLEY, a citizen of the United States, and a resident of Wilkinsburg, in the county of Allegheny and State of Pennsylvania, have invented a new and useful Improvement in Circuit Interrupters, of which the following is a specification.

My invention relates to circuit interrupters and particularly to circuit interrupters for use in connection with alternating-current circuits and also in connection with direct-current circuits wherein the direction of current flow is sometimes reversed.

The object of my invention is to provide a device of the above indicated character that shall respond very quickly to a short circuit or to a load current of predetermined value, it being more specifically intended to open the circuit during the first half cycle of the current wave after the fault occurs.

The single figure of the accompanying drawing is a diagrammatic view of an interrupter embodying my invention.

Similar core members 1 and 2, preferably of rectangular shape and having air gaps 3 therein, are provided with coils 4 and 5, respectively, that are so related to the core members 1 and 2 and to a direct-current circuit 6 as to energize the core members 1 and 2 in opposite directions.

Armatures 7 and 8, of substantially U-shape, bridge the air gaps 3 and are connected by a link 9. A rod or link 10, depending from the link 9, supports a bridging contact member 11 for engagement with stationary contact members 12 in an alternating-current circuit 13. Coils 14 and 15, disposed in the air gaps 3, are connected in series with each other and to the current transformer 16 that is operatively connected to the alternating-current circuit 13.

The current in the coils 14 and 15 is normally not sufficient to interfere with the holding properties of the core members 1 and 2 for the armatures 7 and 8 but, when a short circuit or an overload of predetermined value occurs on the circuit 13, a magnetic flux will be set up by the coils 14 and 15. Since the armatures 7 and 8 have their fluxes directed in opposite directions therethrough, the flux in one of the coils 14 and 15, sufficient to nullify the flux of the armatures, will be in the proper direction to release one of them during the first half cycle of the current wave in the circuit 13 after the fault occurs.

The arrangement of the parts 7, 8, 9 and 10 is such that, when either of the armatures is released, the contact members 11 and 12 will be separated.

While I have shown and described a particular form of my invention, changes may be effected therein without departing from the spirit and scope thereof, as set forth in the appended claims.

I claim as my invention:—

1. An alternating-current-circuit interrupter comprising magnetic means, energized in opposite directions, for holding the interrupter closed and means whereby a current wave of predetermined value in the circuit of the interrupter opposes one of said magnetic means during the first half cycle of the wave to open the interrupter.

2. An alternating-current-circuit interrupter comprising independently energized direct-current electromagnet members co-operating to hold the interrupter closed and means responsive to a current of predetermined value in the circuit of the interrupter for nullifying the flux of one of said members.

3. An alternating-current-circuit interrupter comprising relatively movable contact members, a pair of direct-current electromagnets connected in parallel and energized in opposite directions, an armature for each of the electromagnets, a link mechanism connected to the armatures and to one of the contact members, and an alternating-current coil disposed adjacent to each of the electromagnets for releasing the one or the other of said armatures.

4. An alternating-current-circuit interrupter comprising a stationary and a movable contact member, a pair of similar looped core members having air gaps therein, direct-current coils on said core members energized in opposite directions, a current transformer operatively connected to the circuit of the interrupter, a pair of coils disposed in the said air gaps and connected in series with each other and with the transformer, an armature for each of the electromagnets, a link connecting said armatures, and a link connected to said first link and to movable contact member.

5. A circuit interrupter comprising relatively movable contact members, two electromagnetic members energized by direct current and co-operating to hold the interrupter closed, and a deflecting coil in the magnetic path of each of the magnets, the arrangement being such that, upon overload, with the current flowing through the interrupter in one direction, one of the magnetic members is rendered inoperative and, when the flow of current is in the opposite direction, the other magnetic member is rendered inoperative.

6. A circuit interrupter comprising a pair of holding coils co-operating to hold the interrupter closed, and a pair of deflecting coils each of which is adapted to render one of the holding coils inoperative, one pair of coils being connected in parallel and energized in opposite directions, and the other pair being connected in series.

7. A circuit interrupter comprising a pair of holding coils co-operating to hold the interrupter closed, and a pair of deflecting coils each of which is adapted to render one of the holding coils inoperative, one pair of coils being connected in parallel and energized in opposite directions.

8. A circuit interrupter comprising a pair of holding coils energized by direct current and co-operating to hold the interrupter closed, and a pair of deflecting coils, energized by the main circuit, each of which is adapted to render one of the holding coils inoperative, one pair of coils being connected in parallel and energized in opposite directions.

9. A circuit interrupter comprising relatively movable contact members, two electromagnet members energized by direct current and co-operating to hold the interrupter closed, and a deflecting coil in the magnetic path of each of the magnets, the arrangement being such that, upon overload with the current flowing through the interrupter in one direction one of the electromagnets is rendered inoperative and when the flow of current is in the opposite direction the other electromagnet is rendered inoperative.

In testimony whereof I have hereunto subscribed my name this 13th day of April, 1920.

ALMON W. COPLEY.